UNITED STATES PATENT OFFICE 2,673,874

BASIC ESTERS OF 9,10-DIHYDRO-9,10-ETHANOANTHRACENE-11-CARBOXYLIC ACID AND DERIVATIVES THEREOF

William W. Jenkins, Morton Grove, Ill., assignor to G. D. Searle & Co., Chicago, Ill., a corporation of Illinois No Drawing. Application September 24, 1952, Serial No. 311,305

11 Claims. (Cl. 260—469)

The present invention is concerned with a new class of basic esters of polycarbocyclic acids and, in particular, with the basic esters of 9,10-dihydro-9,10-ethanoanthracene-11-carboxylic acid and its derivatives. The esters and their salts, which constitute this invention can be represented by the following general structural formula

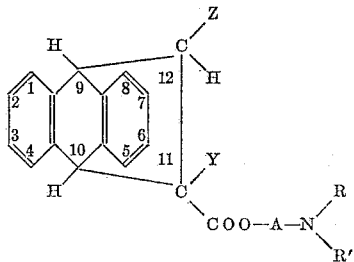

wherein Y and Z are members of the class consisting of hydrogen, lower alkyl, and lower aryl radicals, A is a saturated lower bivalent aliphatic hydrocarbon radical containing at least 2 carbon atoms, and NRR' is either a lower dialkylamino radical or a nitrogen-containing heterocyclic radical attached through a nitrogen in the heterocycle to the radical A.

As shown in the foregoing structural formula the ethano-bridge may be unsubstituted or loweralkylated by the groups referred to as Y and Z which, besides hydrogen, can represent such lower alkyl radicals as methyl, ethyl, propyl, butyl, amyl, and hexyl, as well as such lower aryl radicals as phenyl and tolyl.

The radical A is a straight-chained or branch-chained aliphatic hydrocarbon radical such as ethylene, propylene, butylene, amylene, hexylene or a polymethylene radical such as trimethylene, tetramethylene, pentamethylene and hexamethylene.

The radicals R and R' can be straight or branched chained lower alkyl groups. The radical NRR' can also be a nitrogen-containing lower heterocycle such as piperazine, N'-alkylpiperazino, thiamorpholino, quinolino, and isoquinolino, but of particular interest are the heterocyclic radicals of the type

wherein B is either an ethyleneoxyethylene radical, as in the case of the morpholino radical, or an alkylene chain containing 4 to 7 carbon atoms, 4 to 5 of which are in nuclear position, as in the case of pyrrolidino, piperidino, 2,5-dimethylpyrrolidino and 2,6-lupetidino radicals.

The organic bases described herein form salts, non-toxic in therapeutic dosage, with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, oxalic, ascorbic and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The acids which constitute the starting materials for this invention are prepared by a Diels-Alder addition of a compound of the type

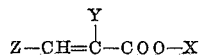

wherein X is hydrogen or a lower alkyl group, and Y and Z are defined as hereinabove, to anthracene. Esterification is carried out preferably by refluxing a solution of the acid with an equivalent of the aminoalkyl halide in an inert solvent such as 2-propanol or acetone. The hydrohalide of the basic ester is thus produced and is separated as such or neutralized and extracted as the basic ester. The basic ester can also be prepared by reacting the acid halide with an excess of the amino alcohol, neutralizing the reaction mixture, and extracting the basic ester.

The esters which constitute the present invention are valuable as intermediates in organic synthesis. The bases and simple acid addition salts are of value because of their action on the cardiovascular system and, especially, as diuretics. The quaternary ammonium salts are likewise active as diuretics and show a potent inhibition of the transmission of autonomic nerve impulses through the sympathetic and parasympathetic ganglia. In addition these salts produce a pronounced blood pressure lowering effect.

My invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing from the scope of the invention. It these examples temperatures are given uncorrected in degrees centigrade (°C.), pressures during vacuum distillation in millimetres (mm.) of mercury, and quantities of materials in parts by weight.

EXAMPLE 1

β-*Diethylaminoethyl ester of 9,10-dihydro-9,10-ethano-anthracene-11-carboxylic acid*

A mixture of 400 parts of anthracene and 300 parts of methyl acrylate is heated in a bomb at 150–175° C. for 6 hours. The contents of the bomb are then taken up in 1800 parts of methanol and heated with a solution of 400 parts of potassium hydroxide and 400 parts of water at reflux temperature for 4 hours. Most of the solvent is distilled off in vacuum and the residue is diluted with 10,000 parts of water, stirred with charcoal and filtered with the aid of a filter agent. The filtrate is acidified and the gummy product is allowed to granulate slowly. The resulting solid is collected on a filter, washed with ether, ground and dried at 80° C. Recrystallized from benzene the 9,10-dihydro-9,10-ethanoanthracene-11-carboxylic acid melts at about 189–191° C.

A mixture of 140 parts of 9,10-dihydro-9,10-ethanoanthracene-11-carboxylic acid and 77 parts of β-chloroethyldiethylamine in 600 parts of anhydrous 2-propanol is heated at reflux temperature for 7.5 hours, after which the solvent is distilled off and the residue extracted with water. The aqueous extract is washed with ether, rendered alkaline by the addition of dilute sodium hydroxide and then extracted with ether. The ether extract is dried over anhydrous calcium sulfate, filtered and evaporated.

60 parts of the residue are dissolved in 325 parts of absolute ether and an equivalent amount of a 25% solution of hydrogen chloride in anhydrous 2-propanol is added. The crystalline hydrochloride of the β-diethylaminoethyl ester of 9,10-dihydro-9,10-ethanoanthracene-11-carboxylic acid separates on chilling. Recrystallized from 2-propanol it melts at about 171.5–172° C.

EXAMPLE 2

9,10-*dihydro-9,10-ethanoanthracene-11-carboxylic acid ester of β-hydroxyethyldiethylmethylammonium bromide*

A mixture of 70 parts of β-diethylaminoethyl 9,10-dihydro-9-10-ethanoanthracene-11-carboxylate and 35 parts of methyl bromide in 200 parts of butanone is heated in a sealed pressure reactor for 1 hour at 80° C. After standing for several hours, the precipitate is collected on a filter. Recrystallized from a mixture of 2-propanol and ethyl acetate, the methobromide of the β-diethylaminoethyl ester of 9,10-dihydro-9,10-ethanoanthracene-11-carboxylic acid melts at about 150–151° C. It has the structural formula

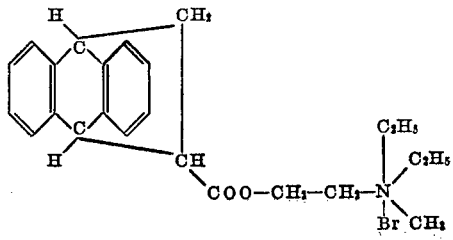

EXAMPLE 3

β-*Diethylaminoethyl ester of 9,10-dihydro-12-methyl-9,10-ethanoanthracene-11-carboxylic acid*

A mixture of 400 parts of anthracene and 300 parts of crotonic acid is heated at 160–180° C. for 6 hours, cooled, digested with 4000 parts of a hot aqueous solution of 10% sodium hydroxide and then filtered while hot. The filtrate is chilled and the precipitate collected on a filter, pressed dry and dissolved in 10,000 parts of tepid water. After clarification with charcoal, the aqueous solution is acidified with dilute sulfuric acid and chilled. The 9,10-dihydro-12-methyl-9,10-ethanoanthracene-11-carboxylic acid is collected on a filter. It melts at about 190–191° C.

A mixture of 310 parts of 9,10-dihydro-12-methyl-9,10-ethanoanthracene-11-carboxylic acid and 143 parts of β-chloroethyldiethylamine in 1600 parts of 2-propanol is heated at reflux temperature for 11 hours and then concentrated in vacuum and extracted with water. The aqueous extract is washed with ether, rendered alkaline by the addition of sodium hydroxide and extracted with ether. The ether extract is dried over anhydrous potassium carbonate, filtered and evaporated. The residue is distilled at about 193–196° C. and 1 mm. pressure.

To a solution of 135 parts of the β-diethylaminoethyl ester of 9,10-dihydro-12-methyl-9,10-ethanoanthracene-11-carboxylic acid in 3500 parts of absolute ether one equivalent of a 25% solution of hydrogen chloride in absolute 2-propanol is added. An oil separates which granulates upon scratching. Upon recrystallization from ethyl acetate the hydrochloride melts at about 134–135° C.

EXAMPLE 4

9,10-*dihydro-12-methyl-9,10-ethanoanthracene-11-carboxylic acid ester of β-hydroxyethyldiethylmethylammonium bromide*

A solution of 150 parts of the β-diethylaminoethyl ester of 9,10-dihydro-12-methyl-9,10-ethanoanthracene-11-carboxylic acid in 240 parts of butanone is treated with 69 parts of methyl bromide in a sealed pressure reactor and heated at 80° C. for 1 hour. Upon standing at room temperature a copious crystalline precipitate is formed. The contents of the reactor are diluted with absolute ether and the precipitate collected on a filter. Recrystallized from butanone the methobromide of the β-diethylaminoethyl 9,10-dihydro-12-methyl-9,10-ethanoanthracene-11-carboxylate melts at about 134.5–136° C. It has the structural formula

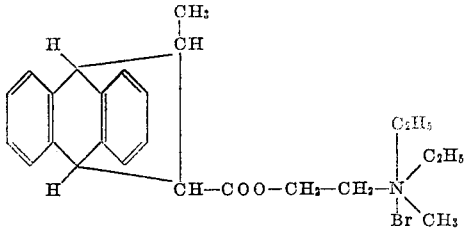

EXAMPLE 5

γ-(*N-morpholino*)*propyl ester of 9,10-dihydro-12-ethyl-9,10-ethanoanthracene-11-carboxylic acid*

A mixture of 400 parts of anthracene and 350 parts of 2-pentenoic acid is heated in a bomb at 170° C. for 6 hours, cooled and extracted with a dilute aqueous solution of sodium hydroxide. The extract is washed with ether, rendered acid by addition of dilute hydrochloric acid, filtered and extracted with ether. The ether extract is stirred with charcoal, filtered and evaporated to yield the 9,10-dihydro-12-ethyl-9,10-ethanoanthracene-11-carboxylic acid.

A mixture of 278 parts of this acid and 165 parts of N-(γ-chloropropyl)morpholine in 2000 parts of absolute 2-propanol is heated at reflux temperature for 15 hours after which the 2-propanol is distilled off in vacuum and the residue extracted with water. The aqueous solution is washed with ether, rendered alkaline by the addition of ammonum hydroxide and extracted with ether. The ether extract is dried, filtered and evaporated. The γ-(N-morpholino)propyl ester of 9,10-dihydro-12-ethyl-9,10-ethanoanthracene-11-carboxylic acid boils at about 215–220° C. and about 1 mm. pressure with decomposition. It has the structural formula

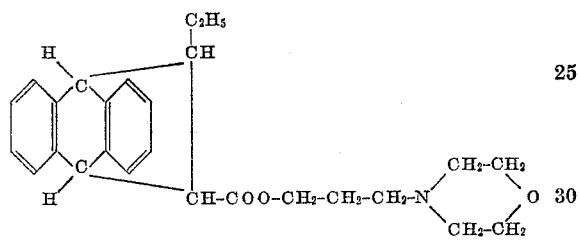

EXAMPLE 6

β-Diethylaminoethyl ester of 9,10-dihydro-11-methyl-9,10-ethanoanthracene - 11 - carboxylic acid A mixture of 800 parts of anthracene and 700 parts of methyl methacrylate is heated in a bomb at 175–180° C. for 7 hours, cooled and taken up in 3000 parts of methanol. After addition of a solution of 800 parts of potassium hydroxide and 800 parts of water, the mixture is heated at reflux temperature for 4 hours. The solvent is then distilled off under vacuum and the residue is treated with 12,000 parts of water and the resulting suspension filtered with a filter aid. The filtrate is acidified with dilute sulfuric acid and the gummy precipitate permitted to granulate. The 9,10-dihydro-11-methyl-9,10-ethanoanthracene-11-carboxylic acid thus obtained is collected on a filter, ground in a mortar, washed with water and dried at 80° C. Recrystallized from benzene its melts at about 210–211° C.

A mixture of 264 parts of 9,10-dihydro-11-methyl-9,10-ethanoanthracene - 11 - carboxylic acid and 141 parts of β-chloroethyldiethylamine in 800 parts of absolute 2-propanol is heated at reflux temperature for 7 hours and then concentrated and extracted with water. The aqueous extract is washed with ether, rendered alkaline and extracted with ether. The ether extract is dried over anhydrous calcium sulfate, filtered and evaporated. 10 parts of the β-diethylaminoethyl ester of 9,10-dihydro-11-methyl-9,10-ethanoanthracene-11-carboxylic acid thus obtained are dissolved in 300 parts of absolute ether and an equivalent of a 25% solution of hydrogen chloride in anhydrous 2-propanol is added with stirring. The promptly forming white precipitate is collected on a filter. Recrystallized from a mixture of ethyl acetate and 2-propanol, the hydrochloride of β-diethylaminoethyl 9,10-dihydro-11-methyl-9,10-ethanoanthracene - 11 - carboxylate melts at about 186.5–187° C.

EXAMPLE 7

9,10-dihydro-11-methyl-9,10-ethanoanthracene-11-carboxylic acid ester of β-hydroxyethyldiethylmethylammonium bromide Within a few minutes after mixing 140 parts of the β-diethylaminoethyl ester of 9,10-dihydro-11 - methyl-9,10-ethanoanthracene-11-carboxylic acid, 69 parts of methyl bromide and 320 parts of butanone, crystallization occurs. The precipitate is collected on a filter and recrystallized from a mixture of ethyl acetate and 2-propanol. The methobromide of the β-diethylaminoethyl 9,10-dihydro-11-methyl-9,10-ethanoanthracene-11-carboxylate melts at about 178.5–179.5° C. Treatment of a solution of 3 moles of the bromide in 2-propanol with one mole of silver citrate and 2 moles of citric acid by stirring at room temperature, removal of the precipitated silver bromide by filtration and concentration of the filtrate yields the dihydrogen citrate. The cation has the structural formula

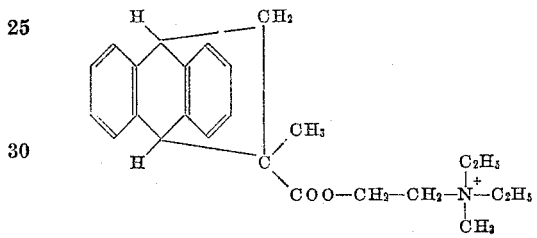

EXAMPLE 8

γ-Diisopropylaminopropyl ester of 9,10-dihydro-11 - ethyl - 9,10 - ethanoanthracene - 11 - carboxylic acid In a bomb a mixture of 800 parts of anthracene and 700 parts of α-ethylacrylic acid is heated at 170–180° C. for 8 hours and then cooled. The contents of the bomb are extracted with a 5% aqueous sodium hydroxide solution. This extract is washed with ether, clarified with charcoal, and acidified with dilute hydrochloric acid. The precipitated acid is collected on a filter.

A mixture of 278 parts of 9,10-dihydro-11-ethyl-9,10 - ethanoanthracene-11-carboxylic acid and 178 parts of γ-chloropropyldiisopropylamine in 2000 parts of anhydrous 2-propanol is heated at reflux temperature for 12 hours, concentrated in vacuum and extracted with water. The aqueous extract is washed with ether and rendered alkaline by addition of dilute sodium hydroxide. The akaline solution is extracted with ether and the ether extract is dried over anhydrous calcium sulfate, stirred with decolorizing charcoal, filtered and evaporated, yielding the γ-diisopropylaminopropyl ester of 9,10-dihydro-11-ethyl-9,10-ethanoanthracene-11-carboxylic acid as a clear oil which boils at about 226–229° C. and 1 mm. pressure with decomposition. It has the structural formula

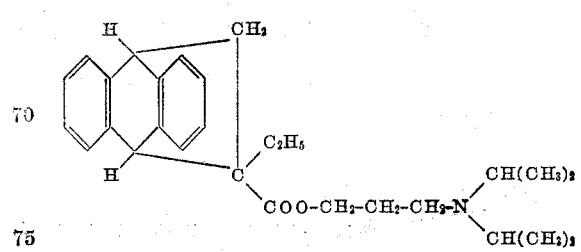

EXAMPLE 9

N-(2,6-lupetidino)ethyl ester of 9,10-dihydro-11,12-diethyl-9,10-ethanoanthracene-11-carboxylic acid A mixture of 100 parts of 2-ethyl-2-pentenoic acid and 100 parts of anthracene is heated in a bomb for 9 hours at 175–185° C., cooled and extracted with a large volume of a 5% aqueous sodium hydroxide solution. The extract is washed with ether, clarified with charcoal, acidified with dilute hydrochloric acid and then extracted with ether. This extract is solvent stripped in vacuo, leaving as a residue the 9,10-dihydro-11,12-diethyl-9,10-ethanoanthracene-11-carboxylic acid.

A mixture of 264 parts of this acid and 158 parts of N-(β-chloroethyl)-2,6-lupetidine in 2500 parts of anhydrous 2-propanol is heated at reflux temperature for 20 hours and then concentrated and extracted with water. The aqueous extract is washed with ether and rendered alkaline by the addition of dilute potassium hydroxide. The base is extracted with ether and the ether extract dried over anhydrous potassium carbonate, stirred with decolorizing charcoal, filtered and evaporated. The resulting N-(2,6-lupetidino)ethyl ester of 9,10-dihydro-11,12-diethyl-9,10-ethanoanthracene-11-carboxylic acid is obtained as a clear amber oil which has the structural formula

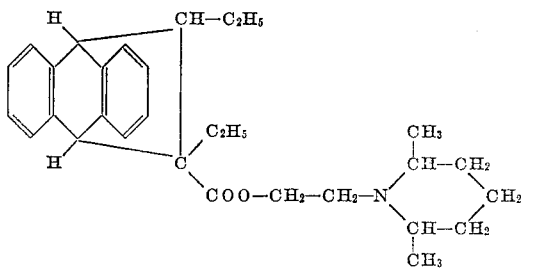

EXAMPLE 10

δ-Dimethylaminobutyl ester of 9,10-dihydro-12-phenyl-9,10-ethanoanthracene-11-carboxylic acid A mixture of 100 parts of anthracene and 200 parts of cinnamic acid is heated in a bomb for 12 hours at 180° C. After cooling the contents are extracted with a large volume of 5% aqueous sodium hydroxide solution. The extract is washed with ether, clarified with charcoal, acidified with dilute hydrochloric acid and extracted with ether. Recrystallized from anisole the 9,10-dihydro-12-phenyl-9,10-ethanoanthracene-11-carboxylic acid melts at about 248° C.

A mixture of 340 parts of this acid and 140 parts of δ-chlorobutyldimethylamine in 2000 parts of anhydrous 2-propanol is heated at reflux temperature for 15 hours, concentrated and extracted with water. The aqueous extract is dried over anhydrous potassium carbonate, filtered and evaporated to yield the δ-dimethylaminobutyl ester of 9,10-dihydro-12-phenyl-9,10-ethanoanthracene-11-carboxylic acid as a clear yellowish oil which has the structural formula

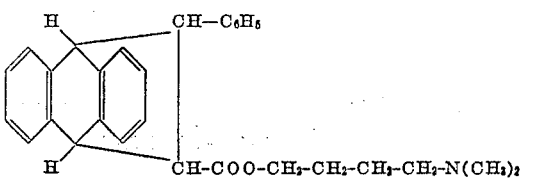

EXAMPLE 11

N-β-diethylaminoethyl-9,10-dihydro-9,10-ethanoanthracene-11-carboxamide 250 parts of 9,10-dihydro-9,10-ethanoanthracene-11-carboxylic acid are converted into the acid chloride by heating with 119 parts of thionyl chloride, 79 parts of pyridine and 1300 parts of benzene at reflux temperature for 1.5 hours. After cooling the mixture is filtered and the filtrate treated with 116 parts of β-aminoethyldiethylamine and heated at reflux temperature for 5 hours. The solvent is stripped and the solid residue is suspended in absolute ether. The N-β-diethylaminoethyl-9,10-dihydro-9,10-ethanoanthracene-11-carboxamide hydrochloride is collected on a filter. Recrystallized from ethyl acetate it melts at about 136–137.5° C.

I claim:

1. The group of new esters consisting of the bases of the structural formula

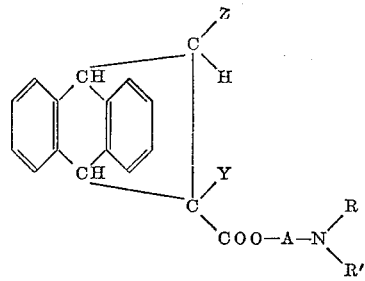

and the non-toxic acid addition and quaternary salts thereof, wherein Y and Z are members of the class consisting of hydrogen, lower alkyl and phenyl radicals, A is a lower alkylene radical separating the carboxyl radical and the nitrogen atom by at least two carbon atoms, and NRR' is a member of the class consisting of lower dialkylamino radicals, morpholino radicals, and radicals wherein R and R' are combined to form a lower alkylene chain containing four to seven carbon atoms, four to five of which are in nuclear position.

2. The esters of the structural formula

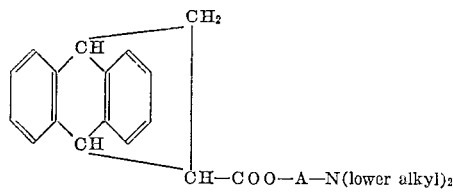

wherein A is a lower alkylene radical separating the carboxyl radical and the nitrogen atom by at least two carbon atoms.

3. β-Diethylaminoethyl ester of 9,10-dihydro-9,10-ethanoanthracene-11-carboxylic acid.

4. The esters of the structural formula

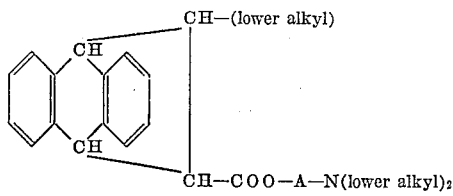

wherein A is a lower alkylene radical separating the carboxyl radical and the nitrogen atom by at least two carbon atoms.

5. The esters of the structural formula

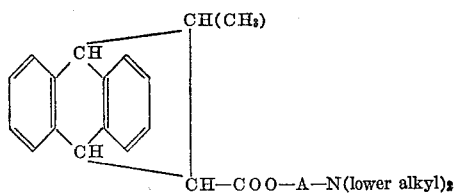

wherein A is a lower alkylene radical separating the carboxyl radical and the nitrogen atom by at least two carbon atoms.

6. β-Diethylaminoethyl ester of 9,10-dihydro-12-methyl-9,10-ethanoanthracene - 11-carboxylic acid.

7. The esters of the structural formula

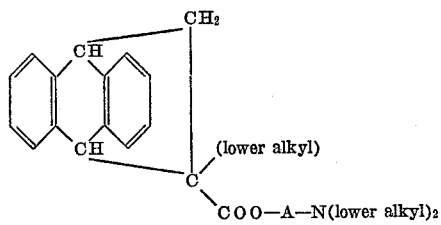

wherein A is a lower alkylene radical separating the carboxyl radical and the nitrogen atom by at least two carbon atoms.

8. The esters of the structural formula

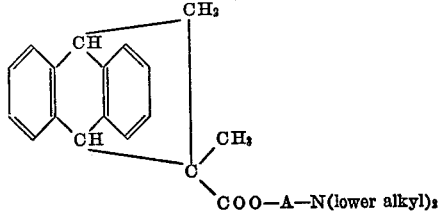

wherein A is a lower alkylene radical separating the carboxyl radical and the nitrogen atom by at least two carbon atoms.

9. β-Diethylaminoethyl ester of 9,10-dihydro-11-methyl-9,10-ethanoanthracene - 11-carboxylic acid.

10. The esters of the structural formula

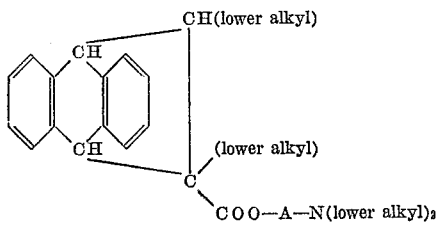

wherein A is a lower alkylene radical separating the carboxyl radical and the nitrogen atom by at least two carbon atoms.

11. The esters of the structural formula

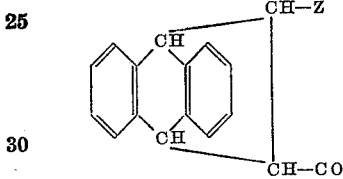

wherein A is a lower alkylene radical separating the carboxyl radical and the nitrogen atom by at least two carbon atoms and Z is a phenyl radical.

WILLIAM W. JENKINS.

No references cited.